Oct. 24, 1950  R. O. PETERSON  2,526,769
INSULATION STRIPPING MECHANISM
Filed Sept. 2, 1944  2 Sheets-Sheet 1
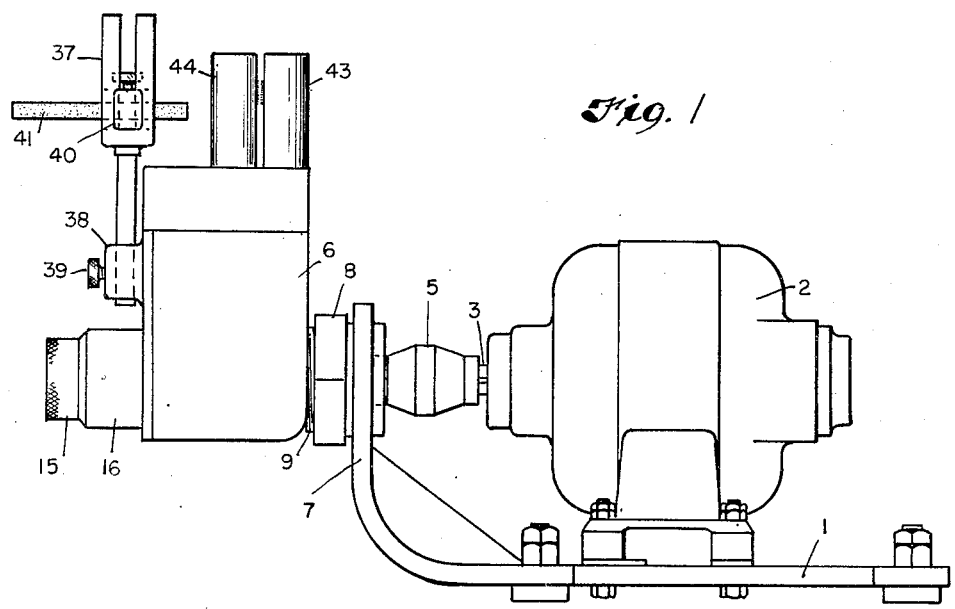
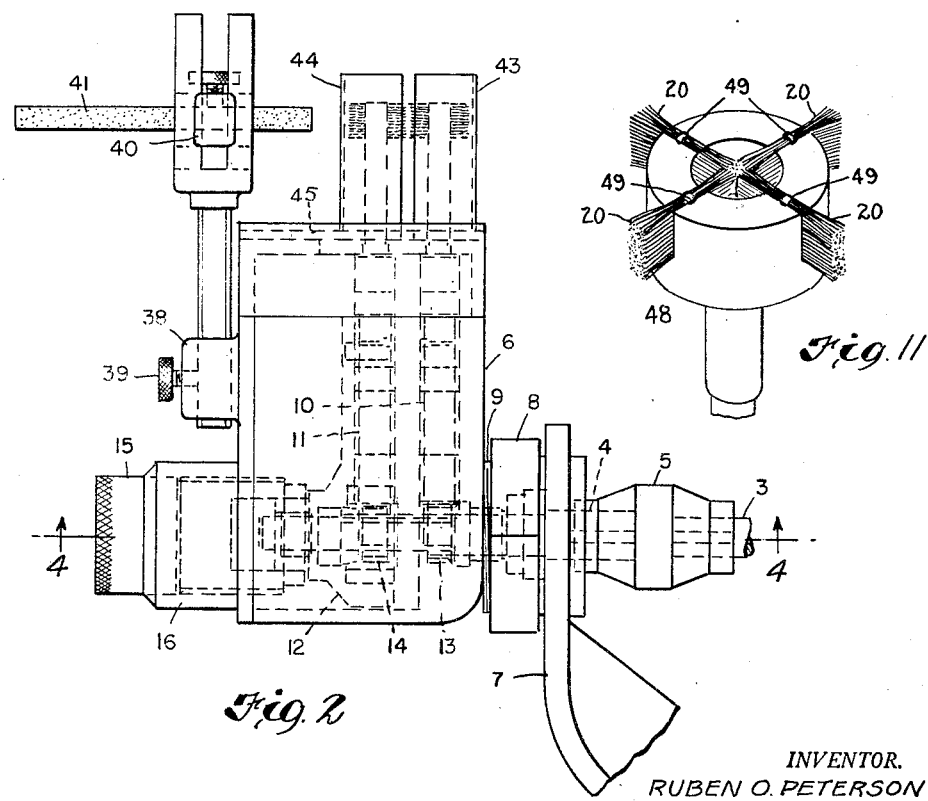
INVENTOR.
RUBEN O. PETERSON
BY
Oberlin, Limbach & Day.
ATTORNEYS Oct. 24, 1950  R. O. PETERSON  2,526,769
INSULATION STRIPPING MECHANISM
Filed Sept. 2, 1944  2 Sheets-Sheet 2
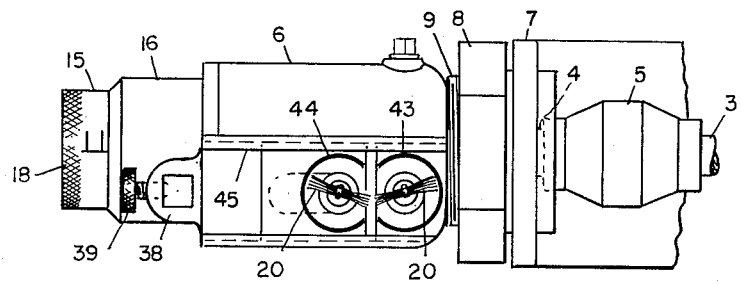
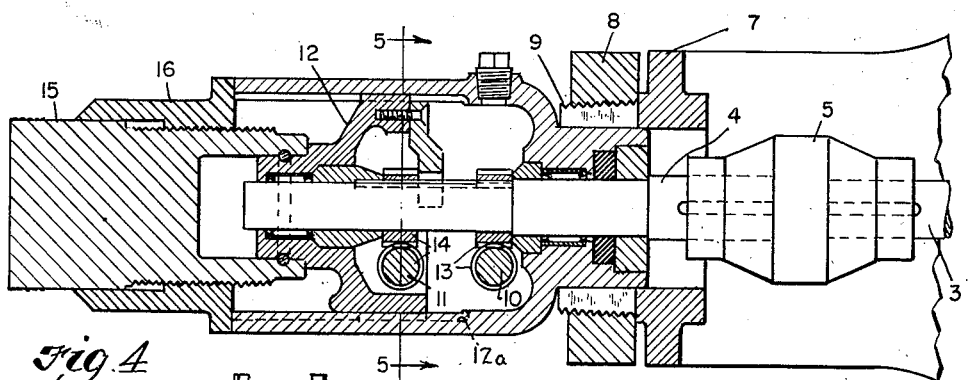
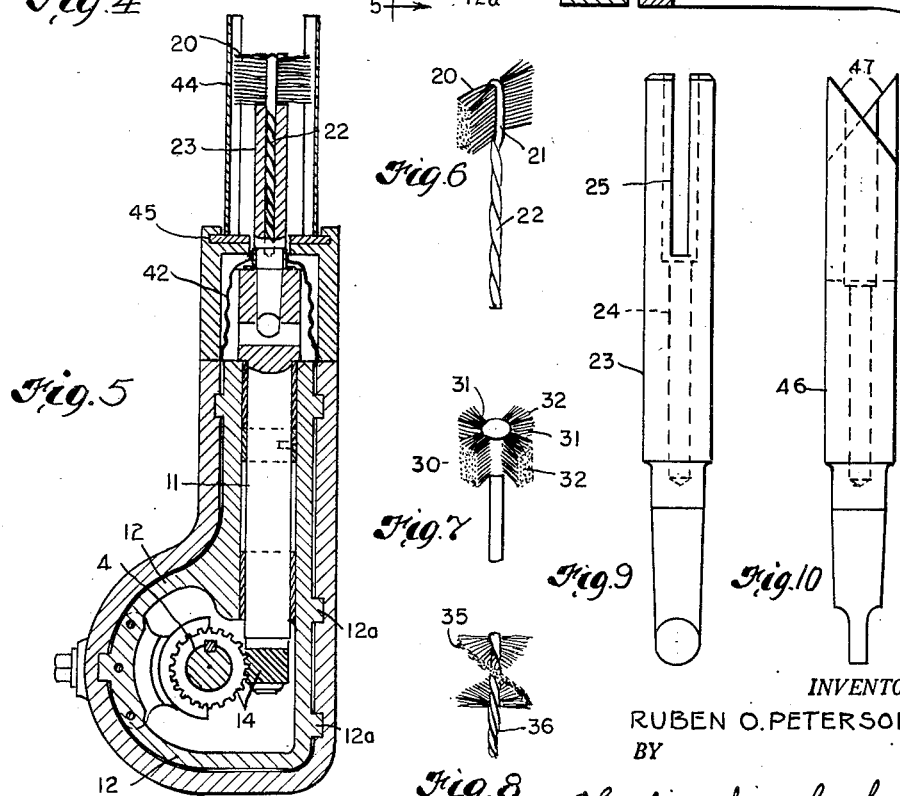
INVENTOR.
RUBEN O. PETERSON
BY
Oberlin, Limbach & Day
ATTORNEYS Patented Oct. 24, 1950

2,526,769

UNITED STATES PATENT OFFICE 2,526,769

INSULATION STRIPPING MECHANISM

Ruben O. Peterson, University Heights, Ohio, assignor to The Osborn Manufacturing Company, Cleveland, Ohio, a corporation of Ohio Application September 2, 1944, Serial No. 552,448

7 Claims. (Cl. 15—21)

The present improvements relate as indicated to means for stripping insulation such as electrical insulation applied to wires employed in the construction of electrical apparatus and equipment. However, such improvements, it will be understood, will be equally applicable to removal from wires and like articles of coatings whatever their character and purpose. For example, in arc welding, welding wires or so-called weldrods are extensively used which have applied thereto flux coatings which, although insulating in character, are primarily designed to beneficiate the weld, such coating being melted off as the rod is consumed in the arm. However, it is necessary that such coated weldrod or wire be bared at one end or some intermediate point in order that electrical connection may be made therewith.

The operation of thus removing electrical insulation, using the latter term to include coatings which may be thus applied for purposes other than that of insulation strictly, requires a particular brushing or abrading action. The insulating material is frequently very tough and hard to remove, and yet in the case of copper conductors the latter must not be damaged. It has been discovered that the desired action can be best obtained by using rotary brushes made up of short trimmed fine wire or equivalent brush material, the faces of the brushes being so formed as to have intermittent rather than continuous contact with the insulation to be removed. In employing brushes of the type described it has been furthermore found important that the brushes be adjusted to exactly the right distance apart if the insulation is to be removed without damage to the conductor within. A further object of the present invention is to provide a simple and compact mechanism for supporting brushes of the type described in adjustable position, i. e. so as to permit them to be tilted to the particular angle which will render them most accessible for operating on various kinds of equipment.

It will be understood that the stripping of insulation from electric conductors is usually performed after the latter have been assembled in a piece of electrical equipment such as a rotor or coil and that damage to the insulation on the assembled portion of the conductor must of course be avoided. At the same time it is undesirable that the leads from which the insulation is to be stripped should be unduly long. A further object of the present invention, accordingly, is to provide insulated stripping mechanism which is capable of operating on such short leads without danger of injury to the parts from which the leads extend.

Still another object is to provide means for conveniently dressing the brushes, so that their operative effect may be accurately gauged.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of the various ways in which the principle of the invention may be used.

In said annexed drawings:

Fig. 1 is a general side elevation of an insulating stripping mechanism embodying the present improvements;

Fig. 2 is a similar view on a larger scale of the opposed brushes which constitute the stripping mechanism proper together with the mounting and driving means therefor;

Fig. 3 is a top plan view of the parts as shown in Fig. 2;

Fig. 4 is a transverse section through the mounting and driving mechanism for the brushes, the plane of the section being indicated by the line 4—4, Fig. 2;

Fig. 5 is a similar section to that of Fig. 4, but taken at right angles thereto, as indicated by the line 5—5, Fig. 4;

Figs. 6, 7 and 8 are perspective views of several different forms of abrading tool or insulation stripping device which may be utilized in the foregoing mechanism;

Figs. 9 and 10 are side elevations of two different forms of shanks or arbors for holding such devices; and Fig. 11 illustrates still another form of holder adapted to carry a plurality of abrading devices.

Referring to Fig. 1, the main frame or support 1 of the mechanism of present interest at the same time constitutes the base on which is mounted an electric motor 2 whereby such mechanism is designed to be driven. The spindle 3 of the motor is aligned with the spindle 4 which constitutes the main drive element of the mechanism, being connected therewith by means of a suitable coupling 5. Said spindle 4 is journalled to a bracket bearings provided in a housing 6 which is attached to a bracket 7 that forms an extension of base 1 so as to be rotatably adjustable about the axis of such aligned spindles 3 and 4. In order to permit such adjustment and firmly secure housing 6 in desired angular position about the axis thus defined, the end thereof adjacent said bracket 7 carries a connector nut 8 which has threaded engagement with a split boss or collar 9 on the bracket. It will thus be seen that by loosening said nut the housing, together with the mechanism carried thereby, presently to be described, may be rotated to occupy any desired angular relation about the axis in question and then secured in such position by again tightening the nut.

As best shown in Fig. 2, disposed at right angles to spindle 4 and, like the latter, journalled in suitable bearings in housing 6 are two parallel arbors 10 and 11, the outer adjacent ends of which are respectively adapted to be fitted with an insulating stripping device, such device preferably having the novel construction and mode of operation which will be later set forth.

The one such arbor, e. g. arbor 10 as shown, is directly thus journalled in the housing 6; however, the other arbor 11 is journalled in a yoke 12 which is mounted in suitable guides 12a in said housing so as to be adjustable axially of spindle 4. The inner end of said arbor 10 has driving connection with the spindle through the medium of spiral gears 13, and arbor 11 similarly has driving connection with said spindle through spiral gears 14 similar to gears 13 except that they provide for rotation of said spindle 11 in a direction opposite to that of spindle 10 (see Figs. 4 and 5). Furthermore, the one of said gears 14 which is carried by the spindle 4 is splined thereon so as to be capable of adjustment, along with the yoke 12, axially of said spindle.

It will be understood that the invention is not limited to the particular form of driving connections between the spindle 15 and the two parallel arbors which carry the abrading tools that serve as insulating stripping devices. In other words, any form of driving connection between said spindle and arbors may be employed which will provide adjustment for varying the center distances between the arbors and at the same time provide for synchronous reverse direction of rotation of said arbors or the tools carried thereby.

Rotatably connected with the outer, i. e. left hand end of yoke 12, as viewed in the figures above referred to, is an adjusting screw 15 which has exterior threaded engagement with an interiorly threaded boss 16 on housing 6. The outer portion of said screw is knurled to facilitate manual rotation thereto and it is furthermore provided on its cylindrical face (see Fig. 3) with suitable markings 17 whereby movement of the yoke and thus of spindle 11 relatively to spindle 10 may be gauged with any desired degree of accuracy. By the means in question it is made possible to determine with corresponding accuracy the setting of the insulation stripping devices carried by the outer adjacent ends of the two spindles.

The detailed construction of the abrading or stripping devices 20, only generally illustrated in the figures thus far referred to, will be found shown in Fig. 6. Upon reference to the latter, each such device will be seen to comprise a flat layer of stranded brush material firmly held between opposed flat-face retaining members 21, e. g. wires, which preferably consist of the doubled portions of a single wire which are twisted together beyond such layer of brush material to form a stem 22. The specially constructed brush element thus provided is then secured in a holder 23, such as shown in Fig. 9, the shank of which is adapted to be fitted into and firmly secured to the end of the corresponding arbor 10 or 11. Such shank may in fact be considered an extension of the arbor to which it is thus secured. For the purpose of securing the brush element in the shank, the latter is provided with a central bore 24 adapted to receive the twisted stem and at its outer end with a transverse slot 25 that intersects such bore and is of such width as tightly to grip the oppositely directed strands of the layer of brush material which comprise the brush proper. These strands may be of wire, either straight or crimped, or other forms of brush material depending upon the particular character of the insulation which is to be stripped. Similarly, the thickness and width of the layer or circumferential extent of the working face of the brush element may be varied to suit the character of the work to be performed.

It will be noted that the brushes of special construction just described are small in diameter, i. e. the brush material is trimmed short, and even where thus arranged in the form of two diametrically opposite sections the material is relatively closely compacted, i. e. such sections densely filled.

In place of a brush of the special construction just described, a circular or rotary brush of the familiar type having a working face of corresponding width may be employed provided the characteristics just stated as to diameter and trim be observed. Preferably, however, the working face of such rotary brush 30, as illustrated in Fig. 7, will be circumferentially interrupted by a plurality of longitudinal grooves 31 so as to leave a corresponding number of lands 32 which will intermittently engage with the work just as do the two opposed sections of the brush made from a layer of stranded brush material illustrated in Fig. 6.

Rotary brushes with other forms of circumferentially interrupted working faces, capable of intermittent engagement with the work, may be utilized, as, for example, the brush illustrated in Fig. 8 wherein a layer 35 of stranded brush material is held between opposed retaining elements 36, just as in the case of the brush illustrated in Fig. 6, except that said elements have been twisted throughout with the result that such layer of brush material assumes the form of a short helix. As before, this layer 35 will be densely filled and trimmed short so that the overall diameter of the brush is small. A shank or holder 46 suited to receive this form of brush is illustrated in Fig. 10, such holder differing from the one shown in Fig. 9 only in that the ends thereof on the opposite sides of the slot therein are slanted or beveled as shown at 47, in order to conform to and better support such helical brush layer.

Fig. 11 illustrates still another form of holder 48 which is adapted to receive a plurality (four as shown) of the type of brush shown in Fig. 6. As will be seen, the body of such modified holder is annular and the brushes in question are seated in recesses 49 in such body, aligned with its axis and formed to present one face of each brush in an outward, radial direction. By reversing such brushes, when one face becomes worn, the other, inwardly directed face comes into use.

In Figs. 1 and 2, there is illustrated a removable attachment to be used when it is desirable to dress the brushes. Such attachment comprises a bifurcated arm 37, the inner end of which is adapted to fit in a socket 38 on the side of housing 6 and there be secured by means of a set screw 39. A slide 40 is movably held between the arms of said bar, such slide being adapted to have clamped thereto in transverse adjusted position the trimming hone or tool 41. By securing such tool in proper position and then moving slide 40 back and forth along bar 37, the working end of the tool will engage the ends of the adjacent brush 20 as the latter is rotated, and trim the working face thereof to even cylindrical contour. By interchanging the brush holders 23, the other brush may then be trimmed or dressed to the same diameter.

The housing 6 will desirably be formed so as to completely encase the mechanism for driving the arbors 10 and 11 as well as for adjusting the one relatively to the other. In addition, a flexible dust cover 42 is desirably employed to surround the projecting ends of the arbors to which the stripping devices, e. g. brush holders 23, are attached, such cover being secured at its base to the adjacent face of the housing. A safety cover comprising two complementary parts 43 and 44 is also desirably provided, as illustrated in Fig. 3, to guard the hands of the operator and prevent insertion of the wires to be stripped further than may be desired. The two parts of the guard will desirably be relatively adjustable on a transverse slide 45, each part comprising a curved portion which extends horizontally over the corresponding brush. By properly adjusting such guard parts, a slot will be left therebetween just the right width to permit introducing the wires to be stripped between the brushes. In fact, the guard part 44, which covers the brush carried by the adjustable arbor 11, may be freely movable on slide 45, so as to follow such brush as the position of the latter is shifted.

Having thus described the detailed construction and operation of the component parts of the mechanism, its general operation may be briefly indicated. As has been explained, the housing 1, which carries the parallel disposed insulation stripping devices with driving mechanism therefor, is angularly adjustable about the axis defined by the motor drive shaft so that it can be secured and fixed at any desirable angle relatively to the main frame or support of the machine. Accordingly, said devices may be presented either vertically, horizontally or at such intermediate angle as will most conveniently serve the use of the operator in working on wires attached to a particular piece of equipment. By means of adjusting screw 15 the stripping devices may be spaced the proper distance apart so as most effectively to engage and remove the insulation on such wires without damage to the latter. The same means of adjustment will also be utilized when it is desired to dress the brushes which constitute the preferred form of such stripping device. It will be understood that the dressing attachment, except when in use, will be removed from the machine.

By employing devices on the order of the several forms of brush which have been described above, whereby the brush face is adapted to act intermittently but in synchronism on opposite sides of the wire to be stripped, it has been found that even tough closely adherent insulating materials may be quickly and cleanly removed. Indeed, such brushes are much more effective than cutting knives such as have had theretofore to be employed in handling tough jobs, and without any danger of cutting or otherwise injuring the wire. This is particularly important in dealing with fine wires, including multiple stranded fine wires such as are used in certain types of electrical equipment. However, the principle of operation exemplified in the machine is equally advantageous in the removal of other types of insulation from wires or rods of comparatively large diameter, such, for example, as the flux coatings from weldrod. Likewise, in handling conductors of flat type, i. e. rectangular in cross-section, the adjustment provided permits ready change for operation on the flat and narrow faces, as required.

A further marked advantage obtained by the use of rotary brushes having circumferentially interrupted faces in stripping insulation or like coatings from wires, etc., is that whereas material, particularly where of a fibrous nature, tends to remain on the brush and reduce the effectiveness of its action in the case of an ordinary rotary brush, by the present improved construction and mode of operation such material is thrown clear both of the brush and the workpiece. In other words, the brush has some of the action of a fan.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In mechanism of the character described, the combination of two parallel arbors respectively adapted to be fitted with an insulation stripping device at adjacent ends, a spindle disposed transversely of said arbors, and driving connection between said spindle and arbors, respectively, one of said arbors together with its driving connections being bodily movable axially of said spindle and said arbors being conjointly adjustable about said spindle as an axis.

2. In mechanism of the character described, the combination of a suitable support, a power driven spindle journalled in said support, a housing attached to said support so as to be adjustable about said spindle as an axis, and two parallel arbors journalled in said housing at right angles to said spindle and intergeared therewith so as to be driven in opposite directions, adjacent ends of said arbors projecting beyond said housing and adapted to be fitted with insulation stripping devices.

3. In mechanism of the character described, the combination of a suitable support, a power driven spindle journalled in said support, a housing attached to said support so as to be adjustable about said spindle as an axis, and two parallel arbors journalled in said housing at right angles to said spindle and intergeared therewith so as to be driven in opposite directions, adjacent ends of said arbors projecting beyond said housing and adapted to be fitted with insulation stripping devices, and one of said arbors being bodily adjustable in said housing axially of said spindle.

4. In mechanism of the character described, the combination of a suitable support, a power driven spindle journalled in said support, a housing attached to said support so as to be adjustable about said spindle as an axis, a yoke adjustable in said housing axially of said spindle, and two parallel arbors disposed at right angles to said housing, one journalled directly in the latter, the other in said yoke, adjacent ends of said arbors projecting beyond said housing and adapted to be fitted with insulation stripping devices.

5. In mechanism of the character described, the combination of two rotary brushes mounted in parallel relation, the faces of said brushes lying in close opposed relation and being circumferentially interrupted, and means adapted to drive said brushes in opposite directions, said driving means being synchronized and said brushes mounted to oppose the successive working portions of such interrupted brush faces to each other as said brushes turn.

6. In mechanism of the character described, the combination of two rotary brushes mounted in parallel relation, the faces of said brushes lying in close opposed relation and being circumferentially interrupted to present two oppositely directed working faces, and means adapted to drive said brushes in opposite directions, said driving means being synchronized and said brushes mounted to oppose the successive working portions of such interrupted brush faces to each other as said brushes turn.

7. In mechanism of the character described, the combination of two rotary brushes mounted in parallel relationship, the faces of said brushes lying in close opposed relation and comprising circumferentially spaced tufts of brush material, means laterally supporting the circumferentially spaced tufts of brush material at points radially outward from the points of attachment of such tufts to stiffen the same, and means adapted to drive said brushes in opposite directions.

RUBEN O. PETERSON.

REFERENCES CITED

The following references are of record in the file of this patent:

UNITED STATES PATENTS

| Number | Name | Date |
| --- | --- | --- |
| 285,222 | Brunelle | Sept. 18, 1883 |
| 680,990 | Compton | Aug. 20, 1901 |
| 1,426,382 | Henning | Aug. 22, 1922 |
| 1,532,717 | Schiller | Apr. 7, 1925 |
| 1,906,809 | Powers | May 2, 1933 |
| 1,970,031 | Collins | Aug. 14, 1934 |
| 2,225,200 | Ames | Dec. 17, 1940 |
| 2,278,944 | Quigley et al. | Apr. 7, 1942 |
| 2,281,256 | Bargfeldt et al. | Apr. 28, 1942 |